Patented Aug. 28, 1928.

1,682,347

UNITED STATES PATENT OFFICE.

HOWARD W. MATHESON, OF MONTREAL, QUEBEC, AND KENNETH G. BLAIKIE, OF SHAWINIGAN FALLS, QUEBEC, CANADA, ASSIGNORS TO CANADIAN ELECTRO PRODUCTS COMPANY, LIMITED, OF MONTREAL, CANADA.

MANUFACTURE OF HYDROXY-ACID ESTERS.

No Drawing.   Application filed January 11, 1926.   Serial No. 80,625.

This invention relates broadly to the manufacture of the esters of hydroxy acids in one step by the reaction of alcohols on the cyanhydrins of ketones or aldehydes, that is, bodies having the general formula $C_nH_{2n}O$ in presence of water and a sufficient amount of a suitable mineral acid to combine with the ammonia liberated, and relates more particularly to such manufacture, using water in amounts approximately equimolecular with the cyanhydrin, that is, less water than would be necessary to hydrolize the cyanhydrins to the acids, but it will be understood that the cyanhydrins go directly to esters without hydrolysis.

In the case of acetaldehyde cyanhydrin the reaction theoretically would take place according to the following equations:—

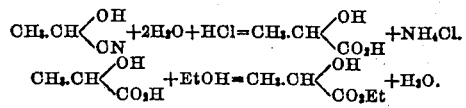

It will be seen from the foregoing reactions that two molecules of water enter into the first reaction and one molecule is liberated on esterification.

We have found that substantially anhydrous esters of hydroxy acids may be directly prepared in one step from the cyanhydrins and an alcohol by the use of approximately only one molecule of water to each molecule of cyanhydrin, the reaction in the case of acetaldehyde-cyanhydrin ethyl alcohol being as follows:—

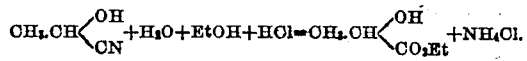

We have also found that the esters of hydroxy acids may be directly prepared in one step from the cyanhydrins and an alcohol by the use of more than one molecule of water to each molecule of cyanhydrin but with a material decrease in yield and with the introduction of other complications. For example, in the case of ethyl lactate production, the addition of two molecules of water gives a yield of about 70% of the theoretical, whereas using only one molecule of water the yield is about 90%.

In carrying out the reaction, it is preferable to dissolve hydrogen chloride gas in an alcohol, which may contain water provided the amount of water in the alcohol does not for maximum yield give a total which is more than the proportion of one molecule of water to one molecule of cyanhydrin. Any additional water required to make the ratio of one molecule of water to one molecule of the cyanhydrin is now added preferably to the cyanhydrin and the alcoholic hydrochloric acid mixture added, preferably gradually. The temperature for carrying out the reaction varies somewhat with the hydroxy ester to be formed but the temperature should not be allowed to rise in any case to a point where the yield is seriously affected, or when the loss of alcohol and hydrochloric acid becomes serious.

Any suitable mineral acid may be used but hydrogen chloride is found preferable.

The following examples will serve to illustrate the carrying out of the process, but it will be understood that the invention is not in any way limited by the range of temperature, modes of operation, acid and cyanhydrin used.

*Example 1.*

A solution of hydrogen chloride in 95% ethyl alcohol is made and the exact acid content determined. A convenient strength is about 18%. 71 parts (one molecule) of acetaldehyde cyanhydrin are placed in a vessel provided with a reflux condenser, an agitator and a thermometer, and the calculated quantity of water added, and the mixture warmed to approximately 50° C. 225 parts (by weight) of 18% alcoholic hydrochloric acid prepared as above are slowly added to the cyanhydrin mixture with agitation. It will be noted that 225 parts of alcoholic hydrochloric acid contain 40.5 parts of hydrogen chloride, which gives approximately 10% excess, and 11.25 parts of water. The calculated quantiy of water mixed with the cyanhydrin is consequently 6.75 parts, which gives a total of 18 parts (one molecule). The reaction proceeds quietly and the temperature should be maintained at about 70° C. by cooling if necessary. During the addition, ammonium chloride separates. After the addition of the acid solution, which takes ordinarily about 1 to 1½ hours, the reaction mixture is heated at about 75° C. for a further period of say three hours.

In carrying out the reaction, it appears advisable to keep the temperature sufficiently below the boiling point of alcohol to avoid formation of a material amount of ethyl chloride. When the reaction is complete, the excess of mineral acid is neutralized with ammonia or any other suitable agent, and the ammonium chloride is filtered off and washed with the minimum quantity of alcohol, in this case, preferably ethyl alcohol. The alcohol is distilled from the combined washings and filtrate after which the ester is separated from residual ammonium chloride and any other matter, preferably by distillation under diminished pressure. The yield is over 90%.

*Example 2.*

123 parts of the cyanhydrin of furfuraldehyde are mixed with 6.75 parts of water; to this is added the same amount of aqueous alcoholic hydrogen-chloride (18%) as given in Example 1, and the same treatment as therein outlined gives the ethyl ester of furfuryl glycollic acid

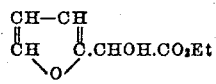

*Example 3.*

99 parts of the cyanhydrin of butraldehyde are mixed with 6.75 parts of water. To this is added the same amount of aqueous alcoholic hydrogen-chloride (18%) as given in Example 1. The same general treatment as formerly outlined gives the ethyl ester of alpha-hydroxy normal valeric acid.

*Example 4.*

85 parts of acetone cyanhydrin are mixed with 6.75 parts of water. To this is addded the same amount of aqueous alcoholic hydrogen-chloride (18%) as given in Example 1. The same treatment as outlined therein gives the ethyl ester of alpha-hydroxy isobutyric acid.

*Example 5.*

133 parts of benzaldehyde cyanhydrin are mixed with 6.75 parts of water. To this is added the same amount of aqueous alcoholic hydrogen chloride (18%) as given in Example 1. The same treatment as therein outlined gives the ethyl ester of mandelic acid (phenyl glycollic acid).

In the foregoing examples, 95% ethyl alcohol has been used. Ethyl alcohol containing varying proportions of water may be used, provided the amount of water in the reaction is calculated to give a total of approximately 18 parts (one molecule) of water to one molecule of the cyanhydrin. For example, if anhydrous alcohol were used in making the acid solution, 18 parts of water would be added to the reaction mixture.

In the foregoing examples, ethyl alcohol has been used throughout in the production of the hydroxy esters. In a similar manner, with proper variations in temperature and proportions, other esters of hydroxy acids may be prepared from the corresponding alcohols.

Variations may be made in case of the examples given in the method, proportions and temperature, without departing from the spirit of the invention. Furthermore, while the reactions of the examples will proceed at room temperature, it is found preferable to heat the mixtures during the period of the reaction, but the reactions themselves may be carried out with great variations of temperature. It will be understood that the mineral acid, alcohol, water and cyanhydrin may be mixed all at one time or at any suitable rates during the progress of the reaction, as may be found convenient or desirable, the chief considerations being ease of temperature control.

Having thus described our invention, what we claim is:—

1. A process for the production of hydroxy acid esters with the exception of lactic acid esters in a single step, which comprises reacting together a cyanhydrin and an alcohol in presence of a mineral acid and water.

2. A process for the production of hydroxy acid esters with the exception of lactic acid esters, which comprises reacting together a cyanhydrin and an alcohol in presence of a mineral acid and less water than would serve to hydrolize all the cyanhydrin to an hydroxy acid.

3. A process for the production of hydroxy acid esters with the exception of lactic acid esters, which comprises reacting together a cyanhydrin and an alcohol in presence of a mineral acid and substantially one-half the water that would serve to hydrolize all the cyanhydrin to an hydroxy acid.

4. A process for the production of hydroxy acid esters with the exception of lactic acid esters in a single step, which comprises reacting together a cyanhydrin of a body having the general formula $C_nH_{2n}O$, and an alcohol in presence of a mineral acid and water.

5. A process for the production of hydroxy acid esters with the exception of lactic acid esters, which comprises reacting together a cyanhydrin of a body having the general formula $C_nH_{2n}O$, and an alcohol in presence of a mineral acid and less water than would serve to hydrolize all the cyanhydrin to an hydroxy acid.

6. A process for the production of hydroxy acid esters with the exception of lactic acid esters, which comprises reacting together a cyanhydrin of a body having the general formula $C_nH_{2n}O$, an approximately equimolecular amount of water and an alcohol in presence of a mineral acid.

7. A process according to claim 4, in which the mineral acid is slightly in excess of the combinable amount.

8. A process according to claim 4, in which the mineral acid used is hydrogen chloride.

9. A process according to claim 6, in which the mineral acid is hydrogen chloride.

In witness whereof we have hereunto set our hands.

HOWARD W. MATHESON.
KENNETH G. BLAIKIE.